March 12, 1968  J. DORY  3,372,576
DIGITAL ULTRASONIC THICKNESS GAUGE
Filed July 14, 1966  3 Sheets-Sheet 1

March 12, 1968     J. DORY     3,372,576
DIGITAL ULTRASONIC THICKNESS GAUGE
Filed July 14, 1966     3 Sheets-Sheet 2

United States Patent Office 3,372,576
Patented Mar. 12, 1968

3,372,576
DIGITAL ULTRASONIC THICKNESS GAUGE
Jacques Dory, Paris, France, assignor to Corporation
Realisations Ultrasoniques, Paris, France, a limited company
Filed July 14, 1966, Ser. No. 565,277
Claims priority, application France, July 17, 1965,
25,031, Patent 1,458,245
4 Claims. (Cl. 73—67.9)

ABSTRACT OF THE DISCLOSURE

A gated ultrasonic echo thickness measuring system having a plurality of trigger circuits and a counter for measuring the travel time of the echo signals and including a gain control circuit for progressively increasing the gain of the echo receiver during a succession of transmitting and receiving cycles.

---

The present invention relates to apparatus for determining the propagation time of an ultrasonic wave in travelling between a transducer transmitting said ultrasonic wave and an object reflecting said ultrasonic wave, said propagation time providing a measurement of the depth of the reflective surface which is either the surface of a defect in the object or the bottom surface of the object.

More specifically, this invention relates to a "digital" apparatus wherein the propagation time is measured through counting of clock pulses, the counting operation being started at the time when the ultrasonic wave is transmitted to the front surface of the object and stopped at the time when the reflected "echo"—either a "bottom echo" or a "defect echo"—is received.

A major difficulty in the operation of such a digital ultrasonic thickness gauge consists in suitably adjusting the sensitivity of the echo receiver; should the sensitivity be too low, the amplitude of the echoes then is too small for stopping the counting operation. On the contrary, should the sensitivity be too high, the counting operation is liable to be stopped by a parasitic echo, thus yielding an erroneous measurement. It is comparatively difficult, in practice, to provide a regulation of the receivers' sensitiveness as a function of unavoidable variations which occur in the conditions of propagation of the ultrasonic wave, which will make constant for instance the amplitude of the bottom echo during the measurement.

It is an object of the invention to provide an apparatus of the type above defined, wherein the propagation time is measured independently of the propagating conditions, without any complex regulation of the receiver's sensitiveness.

The apparatus according to the inventor includes means for progressively increasing the gain of the echo receiver during a succession of operation cycles and means for stopping the counting operation of the pulse counter each time the amplitude of the echo exceeds a predetermined level.

It is another object of the invention to provide a digital ultrasonic thickness gauge of the type above defined, wherein gating means are provided for stopping the counting operation of the pulse counter each time the amplitude of the bottom echo exceeds a predetermined level, the counter being thus nonresponsive to the defect echoes, the amplitude of which is smaller than the said predetermined level.

The foregoing and other objects and advantages of the invention will appear more fully hereinafter from a consideration of the detailed description which follows, taken together with the accompanying drawings, wherein several embodiments of the invention are illustrated by way of example.

Figure 1:
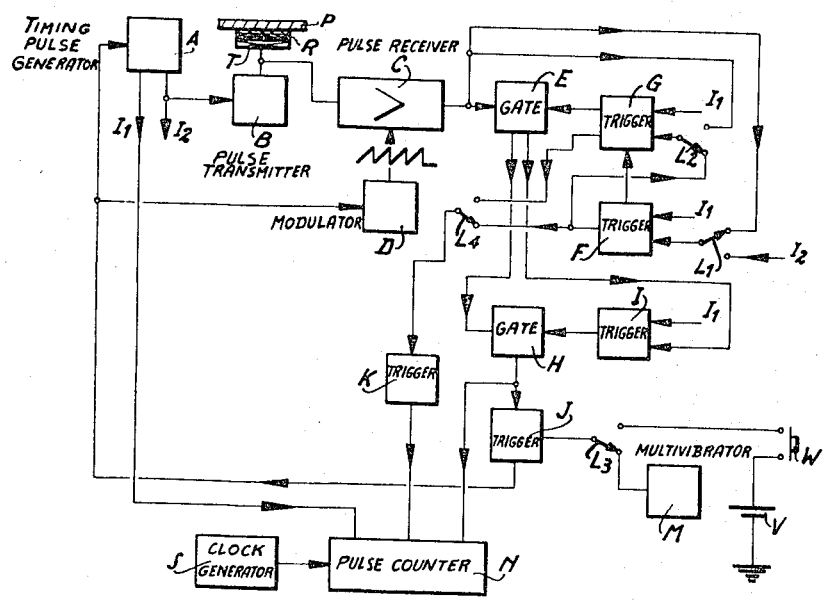
Figure 2:
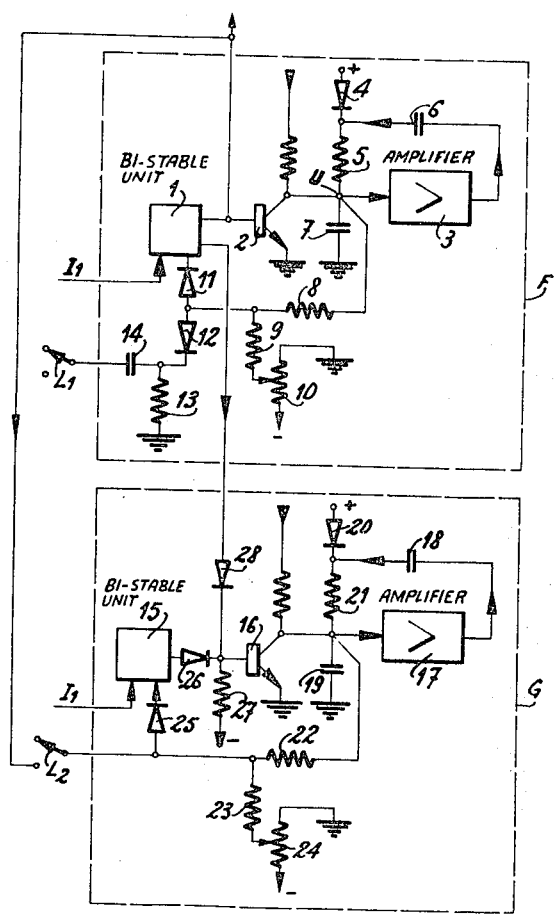
Figure 3:
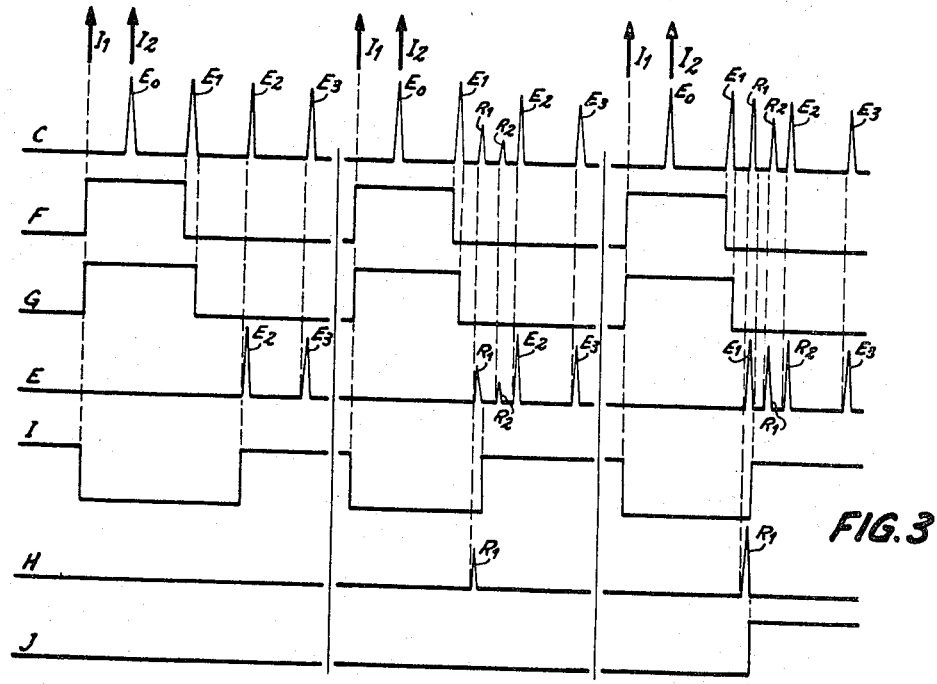
Figure 4:
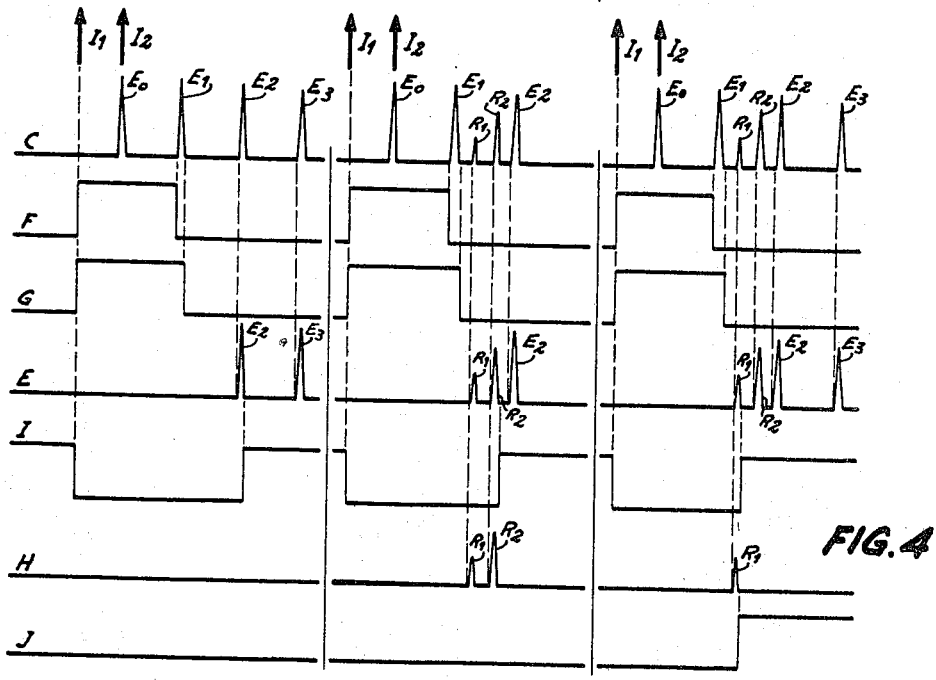

In the drawings:
FIG. 1 is a block diagram of an ultrasonic thickness gauge forming an embodiment of the invention.
FIG. 2 is a circuit diagram of two trigger circuits which form part of the thickness gauge of FIG. 1.
FIGS. 3 and 4 illustrate the wave forms of signals which are produced in the apparatus of FIG. 1.

The apparatus essentially consists of a timing pulse generator A, a pulse transmitter B, a transducer T, a pulse receiver C which advantageously consists of a wide band amplifier, a modulator D, gates E and H, trigger circuits F, G, I, J and K, a multivibrator M and a pulse counter N fed by a clock generator S.

The transducer T is in acoustical contact with a solid part P the thickness of which is to be measured advantageously through an acoustic relay R.

The timing pulse generator A provides recurring pairs of pulses ($I_1$, $I_2$ FIGS. 3 and 4), for instance one pair every cycle of $\frac{1}{500}$ sec., with a time interval of 10 microsec. between $I_1$ and $I_2$.

As apparent from FIG. 1, the pulse transmitter B is fed only with the pulses $I_2$, which modulate into pulse form the high frequency wave generated by the pulse transmitter, to provide recurrent pulses $E_0$ (FIGS. 3 and 4). As well known, the electric pulses $E_0$ are converted by transducer T into recurrent ultrasonic pulses which propagate into the part P and are reflected a number of times on the front and bottom forces thereof, thus providing successive "front echoes" $E_1$, $E_2$, $E_3$ and successive "bottom echoes" $R_1$, $R_2$ for each cycle.

It may also happen that the ultrasonic waves are reflected within the part P by flaws, thus providing "flaw echoes" which will then be located, on FIG. 3, between the "front echoes" $E_1$ and $E_2$.

All the echoes are applied at the input of receiver C and, after amplification therein, are applied to the gate E.

As will be explained in detail hereinafter, the gates and trigger circuits only translate to the pulse counter N the pulses $E_0$ and the bottom and flaw echoes $R_1$, $R_2$ and therefore, counter N provides a digital indication either of the thickness of part P or of the distance from the front surface of part P to a flaw located therein.

The gain of receiver C is modulated by a saw-tooth wave provided by modulator D (FIG. 1), said wave including, for instance, 10 saw-teeth per second.

Each of the trigger circuits F, G, I and J has a first input which is adapted for synchronizing the rising edge of the square wave which the trigger circuit generates, and a second input which is adapted for synchronizing the decaying edge of the square wave.

Thus, the first input of F is connected to output $I_1$ of generator A, whereas the second input of F is connected, according to the position of a switch $L_1$, either to the output $I_2$ of A, or to the output of receiver C. The first input of G is connected to $I_1$ whereas the second input of G is connected, according to the position of a switch $L_2$, either to the output of F or to the output of receiver C. The first input of I is connected to $I_1$ whereas its second input is connected to the output of gate E. The first input of J is connected, according to the position of a switch $L_3$, either to a battery V through a push button W, or to a multivibrator M, whereas the second input of J is connected to the output of gate H. Multivibrator M provides recurrent pulses, for instance a pulse every 5 sec.

It appears, from FIG. 3, that F, G and J provide positive-going square waves, whereas I provides a negative-going square wave.

The trigger circuit K has one output, which is connected to a first input of the pulse counter N, in view of starting the operation of counting the clock pulses provided by generator S, and one input, which is connected to one of the outputs of the trigger circuits F or G, according to the position of a switch $L_4$.

The trigger circuit K is adapted for generating a pulse at its output each time the decaying edge of the square wave generated by F or G is applied to the input of K.

The output of the gate H is connected to a second input of the pulse counter N, in view of stopping the operation of counting the clock pulses each time a pulse the amplitude of which exceeds a predetermined level, is present at the output of H.

The counter N further has a reset input which is connected to $I_1$. It results that the counter is reset to zero at the starting of each cycle.

The output of the trigger circuit J is connected to a control input of the timing generator A, in view of starting and stopping the operation of the said generator, and to a control input of modulator D, in view of starting the operation thereof or resetting the saw-tooth wave to a zero reference voltage.

In FIG. 2, the details of the circuits of the trigger units F and G are shown in the respective dashed line blocks F and G.

The trigger circuit F includes a bi-stable unit 1 having first and second symmetrical outputs, the first output being connected to G, whereas the second output is connected, on one hand to the base electrode of a transistor 2, on the other hand to switch $L_2$. The collector of transistor 2 is connected to the junction point U between the input of an amplifier 3 and a first terminal of a condenser 7, the second terminal of which is grounded. Point U is further connected, through a resistor 5 and a diode 4, to the positive terminal "+" of a voltage source.

The junction point between resistor 5 and diode 4 is connected to the output of amplifier 3, through a condenser 6 which has a capacitance sufficiently large for enabling it fully to translate the signal appearing across its terminals.

Point U is further connected to the second input of bi-stable unit 1 through a voltage divider consisting of resistors 8–9–10 and a diode 11. The second input of unit 1 is further connected to switch $L_1$ through an inhibiting circuit consisting of a diode 12, a resistor 13 and a condenser 14.

The trigger circuit G similarly includes a bi-stable unit 15, a transistor 16, an amplifier 17, condensers 18–19, a diode 20 serially connected with a resistor 21, a voltage divider consisting of resistors 22, 23 and 24, and a diode 25.

The first output of bi-stable unit 1 is connected to a diode 28, which is a part of an AND gate further including a diode 26 connected to the single output of bi-stable unit 15 and a resistor 27 connected to the negative terminal "—" of a voltage source.

The operation of the apparatus of FIGS. 1 and 2 will now be discussed in detail in considering the case when the acoustic relay R is provided.

In this case, the wave form of the signal generated at the output of receiver C during three successive cycles, each of which is separated from the preceeding one by a number of intermediate cycles conforms to diagram "C" at the top of FIG. 3.

The first cycle is started as follows:

Trigger circuit J is triggered into its high level stable state, by means of a pulse which is provided, either by the voltage source V and push button W, or by multivibrator M, according to the position of switch $L_3$. Operation of the timing generator A and modulator D is then started. Pulse $I_1$ of the first cycle resets counter N to zero, triggers F and G into their high level stable state and I into its low level stable state.

The gate E is then made nonconductive by the positive square wave from G, whereas the gate H is made conductive by the negative square wave from I.

The pulse $I_2$ from the second cycle of operation then triggers the transmission of a pulse $E_0$ by the transmitter.

During the first cycle of operation illustrated in the left-hand portion of FIG. 3, the gain of receiver C, which linearly increases during the three successive cycles, is comparatively very small and it results that the echoes $R_1$ and $R_2$ have negligible amplitudes and do not appear in the drawing.

During the second cycle illustrated, however, a number of intermediate cycles has elapsed, and the receiver gain has notably increased. It results that $R_1$ and $R_2$ are present. During the third cycle illustrated, $R_1$ and $R_2$ are present with an increased amplitude and moreover, it may happen that parasitic echoes will be present between $E_1$ and $R_1$ due to a poor acoustical contact between part P and acoustic relay R.

It can be seen in FIG. 3 that the decaying edge of the square wave from F is synchronized at each cycle by $E_1$. This is due to the fact that the inhibiting circuit consisting of diode 12, resistor 13 and condenser 14 (FIG. 2) prevents the synchronization, when the waveform C is applied to $L_1$, before a predetermined time interval has elapsed. This time delay may be selected so as to avoid the synchronization by $E_0$, while obtaining the synchronization by $E_1$.

This will be discussed more in detail with reference to FIG. 2. When transistor 2 is cut off, condenser 7 discharges linearly, the circuit 3–5–6 performing the function of a linear saw-tooth wave generator.

When the voltage across condenser 7 reaches a predetermined level, the bi-stable unit 1 turns over and initiates a flow of current through the transistor, which then short-circuits and discharges the condenser. Resetting of the bi-stable unit 1 to its initial state of equilibrium is obtained through applying a synchronizing pulse at $L_1$. It is possible to obtain a turn over of bi-stable unit 1 before the voltage across condenser 7 has reached the said predetermined level, through applying a synchronizing pulse across diode 11. Anyway, in the absence of such a synchronizing pulse, the turn over takes place after a predetermined time interval has elasped, which will vary as a function of the control voltage which is applied to the bi-stable unit from the condenser via the voltage divider 8–9–10 and diode 11 and, therefore, as a function of the adjustment of the said voltage divider. The operation as above disclosed is in fact, that which would be obtained should the inhibiting circuit not be present. As the diode 12 of said inhibiting circuit remains non conductive as long as the charge of condenser 7 has not reached its maximal value, the potential which is applied to the bi-stable device is insufficient for effecting the turn-over thereof. However, when a suitably preselected time interval has elapsed, the diode transmits the pulse which is applied to condenser 14 and the turn-over results.

The decaying edge of the square wave G is synchronized as follows:

The output of the bi-stable unit which is connected to the AND circuit 26–27–28 delivers a voltage of opposite polarity with respect to the voltage which is applied to the base of transistor 2 for intiating a flow of current therethrough.

It results that, while condenser 7 is discharging, condenser 19 is short-circuited by transistor 16. At the end of the square wave provided by bi-stable unit 1, transistor 16 is made non conductive and, therefore, condenser 19 can be charged and start the decaying edge of bi-stable unit 15.

The decaying edge of bi-stable unit 15 is thus delayed with respect to the decaying edge of bi-stable unit 1, the time delay be so selected through proper selection of the values of the components, that the decaying edge of G will fall after the above mentioned parasitic echoes which may occur after $E_1$.

The gate E translates the echoes from receiver C only after the end of the square wave G and, therefore, translates only the echoes which follow $E_1$, the above mentioned parasitic echoes being excluded (FIG. 3).

The trigger circuit I is of the same type as unit G of FIG. 2 and has the above disclosed type of operation of such an arrangement when it does not include any inhibiting circuit, i.e., it can turn over, either after a predetermined time interval has elapsed, or under the action of a pulse synchronizing its decaying edge, provided that the amplitude of the said pulse exceeds a predetermined level.

More precisely, through proper selection of the components values, the trigger circuit I will turn over either a short time interval before the occurence of $E_2$ in the absence of any echoes $R_1$, $R_2$ having an amplitude exceeding the said predetermined level (as it is the case in the first cycle of operation illustrated in FIG. 3), or under the action of $R_1$ or $R_2$, in the cycles in which the said echoes have an amplitude having the said predetermined level.

In order further to discuss the operation of the apparatus, two different cases will now be considered.

A first case is that, which is illustrated in FIG. 3, when the first echo $R_1$ has an amplitude larger than that of the second echo $R_2$. This is the case when $R_1$ and $R_2$ are successive bottom echoes, the ultrasonic waves having met no flaw within part P.

Then, trigger circuit I is synchronized as shown in FIG. 3, Gate H, which is controlled by the output from I, translates those of the echoes issued from E which fall outside of the high level condition of the square wave I, e.g., echo $R_1$, as soon as its amplitude exceeds a predetermined level, which occurs at one of the succeeding cycles of operation.

Then, J will turn over and will stop the operation of the timing pulse generator and of the modulator, whereas the operation of the counter will be stopped by H. It results that the count of the counter will then be "frozen" and remain displayed until a new measurement is started by W or M.

In the first case presently being discussed, switch $L_4$ connects the "start conting" control input of the counter, through trigger circuit K, to the output of trigger circuit F. Therefore, the start of the counter substantially coincides with the decaying edge of square wave F and with $E_1$.

It finally results that the count of the counter is directly proportional to the propagation time of the ultrasonic waves from the front to the bottom surfaces of part P and, therefore, measures the thickness of the part.

An important advantage of the invention is that the stopping of the counting operation is triggered by a bottom echo $R_1$ the amplitude of which has a predetermined constant level and does not depend of the quality of the acoustical coupling between the part and the transducer.

A second case is that, illustrated in FIG. 4, when $R_1$ is a flaw echo, having therefore an amplitude smaller than that of the bottom echo $R_2$. According to the adjustment of the amplitude level of triggering of the decaying edges of I and J, one will then obtain two different modes of operation.

In a first mode of operation, the triggering level of I is but slightly inferior to that of J. Then, $R_2$ will synchronize I at a given cycle and, at the following cycle, will synchronize J before $R_1$ has reached an amplitude level large enough for enabling it to synchronize I. In this first mode of operation, the counter will therefore indicate the thickness of the part.

In a second mode of operation, the triggering level of I is smaller than that of J by 50%. Then, $R_1$ will synchronize I before $R_2$ has been able to synchronize J. Therefore, gate H is made nonconductive just after the occurrence of $R_1$, and $R_2$ is not translated (FIG. 4). During the succeeding cycles of operation, $R_1$ exceeds the triggering level of J and synchronizes it.

In this second mode of operation, the counter will finally indicate the distance between the front surface of the part and the flaw.

The above discussion relates to an apparatus including an acoustic relay as shown in FIG. 1. Should the transducer be in direct contact with the front surface of part P, the operation of the apparatus would be quite similar to that which has been disclosed hereinabove, except that switch $L_1$ should then connect F to $I_2$.

In certain applications, the acoustical relay will include, not only a solid block as shown in FIG. 1, but furthermore a liquid layer: then switch $L_4$ should connect G to K.

It is to be understood that various changes can be made in the design and arrangement of the parts of the apparatus disclosed without departing from the spirit and scope of the invention.

What is claimed is:

1. In an apparatus for determining the propagation time of ultrasonic waves in travelling between a transducer transmitting said ultrasonic waves and an object reflecting said ultrasonic waves, said object having a front surface to which said ultrasonic waves are transmitted and a reflecting surface from which said ultrasonic waves are reflected, the combination of transmitter means for generating recurring trains of electrical high frequency waves during respective operation cycles, transducer means connected to said transmitter means for converting said recurring trains into corresponding recurring trains of ultrasonic waves, said transducer means transmitting said trains of ultrasonic waves towards said object, receiving said ultrasonic waves reflected from said object and converting said received ultrasonic waves into corresponding received electrical pulses; receiver means connected to said transducer means for amplifying said received electrical pulses, said receiver means having a gain control input; modulator means, connected to the said gain control input, for progressively increasing the gain of said receiver means during a succession of operation cycles; a clock generator; a pulse counter having a pulse input connected to said clock generator, said counter further having a "start counting" control input and a "stop counting" control input; and-gating means, connected to said "start counting" and "stop counting" control inputs, for starting the operation of the counter at the time when one of said trains of ultrasonic waves is transmitted to the front surface of the object and for stopping the operation of the counter when the amplitude of the amplified received ultrasonic pulses corresponding to the ultrasonic waves reflected from said reflecting surface exceeds a predetermined level.

2. The apparatus as defined in claim 1, wherein said modulator means comprise a saw-tooth generator having a period which is substantially larger than the recurrent period of said trains.

3. In an apparatus for determining the propagation time of ultrasonic waves in travelling between a transducer transmitting said ultrasonic waves and an object reflecting said ultrasonic waves, said object having a front surface to which said ultrasonic waves are transmitted and a reflecting surface from which said ultrasonic waves are reflected, the combination of transmitter means for generating recurring trains of electrical high frequency waves during respective operation cycles, said transmitter means including a timing pulse generator having a control input and first and second outputs and providing recurring pairs of timing pulses during said respective operation cycles, each pair including a first timing pulse provided at said first output and a second timing pulse provided at said second output, said transmitter means further including a pulse transmitter having an input connected to said second output of the timing pulse generator and an output; transducer means connected to the output of said pulse transmitter for converting said recurring trains into corresponding recurring trains of ultrasonic waves, said transducer means transmitting said trains of ultrasonic waves towards said object, receiving said ultrasonic waves reflected from said object and converting said received ultrasonic waves into corresponding received electrical pulses; receiver means connected to said transducer means for amplifying said received electrical pulses, said receiver means having a gain control input and an output; modulator means having a control input, and comprising a saw-tooth generator having a period which is substantially larger than the recurrent period of said trains, said modulator being connected to the said gain control input, for progressively increasing the gain of said receiver means during a succession of operation cycles; a clock generator; a pulse counter having a pulse input connected to said clock generator, said counter further having a "start counting" control input, a "stop counting" control input and a "resetting" control input, said resetting control input being connected to the first output of said timing pulse generator; and gating means, including first and second gates and first, second, third, fourth and fifth trigger circuits; said first gate having a first input connected to the output of said receiver means, a second input and first and second outputs; said second gate having a first input connected to the first output of said first gate, a second input, and an output connected to said stop counting control input; said first trigger circuit having first and second outputs, a first input connected to the first output of said timing pulse generator and a second input; first switching means adapted for connecting the second input of said first trigger circuit to the second output of said timing pulse generator and to the output of said receiver means; said second trigger circuit having a first input connected to the first output of said timing pulse generator, a second input connected to the second output of the first trigger circuit, a third input, a first output connected to the second input of said first gate and a second output; second switching means adapted for connecting the third input of said second trigger circuit to the output of said receiver means and to the first output of said first trigger circuit; said third trigger circuit having a first input connected to the first output of said timing pulse generator, a second input connected to the second output of said first gate, and an output connected to the second input of said second gate; said fourth trigger circuit having a second input connected to the output of said second gate, a first input, and an output connected to the control inputs of said timing pulse generator and of said modulator means; starting pulse generating means connected to the first input of said fourth trigger circuit; said fifth trigger circuit having an output connected to said "start counting" control input of the pulse counter and an input; and third switching means adapted for connecting the input of said fifth trigger circuit to the second output of said second trigger circuit and to the first output of said first trigger circuit.

4. The apparatus as defined in claim 3, wherein each of the said trigger circuits consists of a rectangular wave generator, the first input of each said trigger circuit being adapted for synchronizing the rising edge of the rectangular wave whereas the second input is adapted for synchronizing the decaying edge of the rectangular wave.

References Cited
UNITED STATES PATENTS 3,033,029 5/1962 Weighart _____ 73—67.8
3,175,639 3/1965 Liben _____ 181—0.5

FOREIGN PATENTS 1,368,133 6/1964 France.

RICHARD A. FARLEY, *Primary Examiner.*